INVENTOR.
CEBERN B. TRIMBLE
BY
Louis A. Kline
HIS ATTORNEY

April 13, 1954 C. B. TRIMBLE 2,675,544

SIGNAL-TRANSMITTING APPARATUS

Original Filed March 15, 1946 2 Sheets-Sheet 2

INVENTOR.
CEBERN B. TRIMBLE
BY Louis A. Kline
HIS ATTORNEY

Patented Apr. 13, 1954

2,675,544

UNITED STATES PATENT OFFICE 2,675,544

SIGNAL-TRANSMITTING APPARATUS

Cebern B. Trimble, Dayton, Ohio

Original application March 15, 1946, Serial No. 654,561, now Patent No. 2,558,888, dated July 3, 1951. Divided and this application March 17, 1951, Serial No. 216,228

3 Claims. (Cl. 340—351)

This invention relates to a novel signal-transmitting apparatus and in particular to an apparatus for generating and transmitting several kinds of signal sequences which can cause different operations to be performed when received by a related receiving apparatus.

This application is a division of United States patent application Serial No. 654,561, which was filed on March 15, 1946, and which issued on July 3, 1951, as Patent No. 2,558,888.

In the embodiment to illustrate the invention, the novel transmitting apparatus forms a part of a remote control system in which the transmitting apparatus can selectively send out different signal sequences which can control a receiving apparatus to cause the operation of a mechanism to be started and stopped at will and to cause the receiving apparatus to be reset to a starting condition at will.

In the remote control system, the sending apparatus is arranged to send out a preassigned signal sequence containing a predetermined number of signals each consisting of oscillations at a selected frequency, $F_1$, followed by a further number of signals each consisting of oscillations at a different frequency, $F_2$, which may be followed by more signals at frequency $F_1$ and then more at frequency $F_2$, etc., until the desired signal sequence has been formed.

Electronic means are utilized to produce the signals, and, merely by changing a few simple electrical connections, any desired combinations of signals which are made up of oscillations at frequency $F_1$ and signals which are made up of oscillations at frequency $F_2$ may be obtained. These conditions enable a wide variety in signal sequences to be obtained and also enable changes in the signal sequences to be made readily.

The sending apparatus also is provided with means which can cause a distinctive signal sequence to be sent to the receiving apparatus to cause the receiving apparatus to be operated to restore various parts of the receiving apparatus to home or normal position before the sequence of signals is sent thereto, thus insuring that the receiving apparatus will always be set properly before it begins to respond to the signal sequence and will cause the operation of some further means only if the proper signal sequence is received.

The special restoring signals may have a particular characteristic which distinguishes them from the signals of the signal sequence, or they may consist of a certain preselected combination of signals similar to those used in the signal sequence.

As will be clear from the following description, the sending apparatus may be arranged to send out a signal sequence made up of signals consisting of oscillations at any one of three or more different frequencies, and, when this is done, the receiving apparatus will consist of a corresponding number of portions which respond selectively to various ones of the frequencies.

The invention is particularly adapted for use with a mobile sending apparatus, and, in view of this, the embodiment used to explain the invention will consist of a sending apparatus carried by an automobile from which it is desired to control a receiving apparatus remotely to cause the operation of a garage-door- or closure-operating mechanism, a light switch, and/or any other desired apparatus.

The sending apparatus of this embodiment will be capable of generating and responding to a signal sequence using two frequencies and containing preselected numbers of signals which consist of oscillations at either of these frequencies.

The sending apparatus is coupled to the receiving apparatus either by an electromagnetic field or by an electrostatic field, depending upon the frequencies used in the signal sequence, the signals being radiated from an antenna or loop located behind the grill at the front of the automobile or at some other convenient location thereon and being received by an input means or antenna mounted on the garage, either inside or outside thereof.

It is an object of the invention, therefore, to provide a transmitting or sending apparatus which can generate a desired signal sequence containing a predetermined combination of different numbers of signals at a plurality of preselected frequencies.

A further object of the invention is to provide a sending apparatus which can be adjusted readily to change the signal sequence which will be generated.

A further object of the invention is to provide a novel sending apparatus which can be operated to generate special restoring signals which can operate a receiving apparatus to cause various parts of the receiving apparatus to be restored to their unoperated or starting position before the signal sequence is sent thereto.

A further object of the invention is to provide a novel transmitting or sending apparatus which can send a predetermined signal sequence to a receiving apparatus to cause an operation of mechanism to be initiated and which can send a further signal sequence to cause the operation to be interrupted, if desired, before a complete operation thereof.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

*General description*

Figure 1:
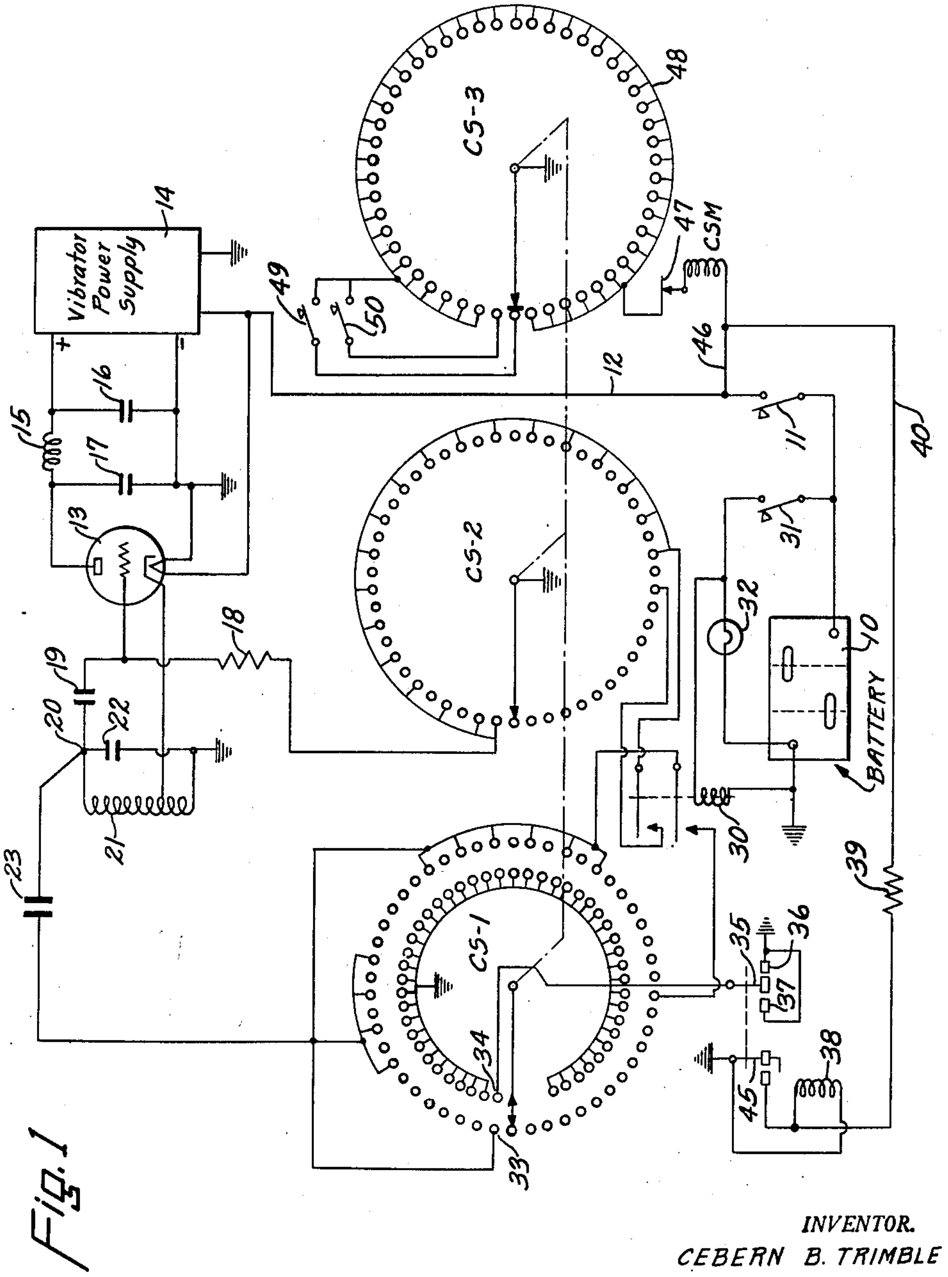
Fig. 1 is a circuit diagram of the preferred form of the sending apparatus.

In order to explain the operation of the sending apparatus, it will be described in connection with the remote control of a garage door from a vehicle. The sending apparatus is adapted to be operated from the storage battery of an automobile, and the form shown in Fig. 1 consists of an electron-coupled oscillator and a controller which can control the oscillator to cause the oscillator to oscillate selectively at either of two selected frequencies to enable signals, made up of oscillations at either one or the other of these frequencies, to be generated.

The oscillator contains a vacuum tube which is provided with an inductance and capacitance in parallel in its grid circuit, the values of inductance and capacitance being so chosen that they will cause the oscillator to oscillate at a desired frequency $F_1$ to enable signals made up of oscillations at this frequency to be produced. When it is desired to cause the oscillator to oscillate at a different frequency, $F_2$, a second capacitor, which provides an additional capacitance, is connected across the inductance and in parallel with the other capacitance and enables signals made up of oscillations at this second frequency, $F_2$, to be generated.

The controller is a step-by-step operating switch which has one portion to control when the additional capacitance will be effective and thus controls the frequency at which the oscillator will operate, and has another portion to determine when the oscillator will operate.

At the end of an operation of the sending apparatus, the switch in the controller will be located in its normal or home position. When the switch is given its first step of movement, it connects the second capacitor to a vibrator which is operable to connect the additional capacitance across the inductance and the other capacitance and disconnect it therefrom at a high rate of speed. This causes the oscillator to produce signals made up of oscillations at $F_1$ and signals made up of oscillations at $F_2$ alternately in rapid succession. As long as the switch remains in the positiion which is one step out of home position, the rapidly alternating signals made up of oscillations at $F_1$ and $F_2$ will be generated. In the embodiment used to explain the invention, these signals will be distinctive from the signals of a signal sequence and will be effective to cause the receiving apparatus to operate and restore various parts thereof to their home or unoperated condition. This restoration of the parts of the receiving apparatus eliminates any error which might otherwise arise due to the unintentional operation of the receiving apparatus by stray signals or static, and insures that the receiving apparatus will respond properly only when the required signal sequence has been received.

After the switch has been in its first position long enough to allow the parts of the receiving apparatus to be restored, it can be given another step of movement to its second position, where a third portion of the switch takes over and causes the swtich to operate automatically step by step forward until it resumes its home position. During this automatic operation of the switch, its first-named portion controls the oscillator to produce the signal sequence containing predetermined numbers of signals, each of which signals will contain oscillations at one or the other of the different selected frequencies.

In the instant embodiment, the normal signal sequence for causing an operation of the door-operating mechanism will consist of three signals, each of which is made up of oscillations at $F_1$, followed by four signals, each of which is made up of oscillations at $F_2$, then by two signals at $F_1$, six signals at $F_2$, and finally three signals at $F_1$. When it is dark and the lights of the automobile are lighted, means in the light circuit of the automobile will modify the control by the first- and second-named portions of the switch to cause an additional signal at $F_2$ to be transmitted following the normal signal sequence, which additional signal will be effective to control the light circuit in the garage to cause the lights in the garage to be lighted or extinguished as required.

If, after an operation of the door-operating mechanism has been initiated, it is desired to stop the operation of this mechanism, the stepping of the switch to its first position out of normal, or restoring position, will, as an incident to the restoring of the parts of the receiving apparatus, cause the operation of the mechanism to be interrupted immediately.

The sending apparatus and the receiving apparatus are coupled by either an electromagnetic field or an electrostatic field which radiates from a coil or antenna located at the front of the automobile each time a signal is generated.

The sending apparatus can readily be changed to utilize different frequencies merely by changing either the inductance or the capacitance values, or both, in the grid circuit of the oscillator. Similarly, the signal sequence can readily be changed merely by changing a few circuit connections in the switch of the controller in the sending apparatus, so that the additional capacitance can be made effetcive in a different desired sequence.

*Detailed description*

The circuit diagram of one form which the novel sending apparatus may take is shown in Fig. 1, in which the usual storage battery of the automobile is shown at 10. The positive terminal of the battery 10 is connected to a normally open, manually operable switch 11, which, when operated to prepare the sending apparatus for operation, connects the positive battery terminal over conductor 12 to one side of a cathode heating element of a vacuum tube 13 of the oscillator and also connects the positive battery terminal to a vibrator power supply 14, which supplies potential to the anode of the tube 13.

The negative terminal of the battery 10 is connected to ground, and the circuits to the heating element and vibrator power supply, as well as to the various other elements of the sending apparatus, are completed by also connecting these elements to ground, as will be clear from Fig. 1.

The anode circuit contains a radio-frequency choke coil 15, a filter capacitor 16, and a by-pass capacitor 17, one side of each of the capacitors being connected to ground.

The control grid of tube 13 is connected to a grid-leak resistor 18, which can be grounded in a manner to be explained hereinafter, and is also coupled through a capacitor 19 to point 20, to which one side of a coil 21 and a capacitor 22 are connected. The coil 21 and the capacitor 22 are connected in parallel by having their other sides connected to ground. The inductance of coil 21 and the capacitance of the capacitor 22 are so chosen that the coil 21 and the capacitor 22 will cause the oscillator to oscillate at a pre-selected frequency, $F_1$, when the grid is grounded through the grid-leak resistor 18.

The cathode of the tube 13 is connected to a point intermediate of the ends of the coil 21.

A capacitor 23 also has one side connected to point 20 and can be connected in parallel with the coil 21 and the capacitor 22 whenever its other side is grounded. The capacitance of capacitor 23 is so chosen that, when the capacitor 23 is connected in parallel with coil 21 and capacitor 22, it will change the constants of the control circuit of the oscillator and will cause the oscillator to oscillate at a different selected frequency, $F_2$. The manner in which the capacitor 23 can be connected to ground at desired times will be explained.

When frequencies $F_1$ and $F_2$, at which the oscillator oscillates, are in the lower range—for instance, about 150 kc. and 100 kc., respectively—and the sending apparatus and the receiving apparatus are to be coupled by an electromagnetic field, the coil 21 is located behind the usual radiator grill or at some other convenient part of the automobile and radiates these oscillations as they are generated. If frequencies $F_1$ and $F_2$ are in a higher range—for example, in the ultra high radio frequency range—and the sending apparatus and the receiving apparatus are to be coupled by an electrostatic field, then an antenna can be located behind the usual radiator grill or at some other convenient part of the automobile and can be connected to point 20 in the circuit of Fig. 1.

The controller includes a step-by-step operating switch having three portions, CS-1, CS-2, and CS-3. The switch is given its step-by-step movement by a switch-operating magnet CSM, which operates a wiper in each portion one step each time the magnet returns to unoperated condition after having been energized. The switch shown in the embodiment will return to home position after fifty steps of operation, but it is clear that switches which return home in smaller number of steps of operation could be used if smaller capacity were desired.

Portion CS-1 includes a double bank of contacts which are successively bridged by a wiper which is given a step-by-step clockwise movement, as viewed in Fig. 1, when the switch is operated.

Portions CS-2 and CS-3 include single banks of contacts which are traversed by related wipers which also are given a similar step-by-step clockwise movement when the switch is operated.

The wipers in the various portions are insulated from each other, but are connected for step-by-step movement in unison by the magnet CSM operating through a ratchet-and-pawl drive, as is well known in this type of switch. All three wipers are shown in their home positions in Fig. 1.

The portion CS-2 of the switch is effective to control the operation of the oscillator, the grid-leak resistor 18 of the oscillator being connected to certain of the contacts of portion CS-2, and, as the wiper, which is connected to ground, engages these contacts, the grid-leak resistor 18 is grounded to render the oscillator operable. In the instant embodiment, the resistor is normally connected to contacts in positions 1, 2, 4, 6, 8, 10, 12, 14, 16, 18, 20, 22, 24, 26, 28, 30, 32, 34, and 36 clockwise from normal or home position. Resistor 18 can also be connected to the contact in the thirty-eighth position from home position by a relay 30 in the light circuit of the automobile when the light switch 31 is closed and the lights, indicated generally at 32, are lighted and it is desired to send out a signal to control the garage light circuit.

The portion CS-1 of the switch controls the grounding of the capacitor 23 and thereby controls the frequency at which the oscillator will operate. This portion enables the sending of the required normal or modified signal sequences.

In the first position clockwise from home position, the wiper of portion CS-1 bridges a contact 33, which is connected to the capacitor 23, and a contact 34, which is connected to a blade 35 of a vibrator, which blade operates rapidly to alternately engage contacts 36 and 37, which are connected to ground. As the blade 35 passes between contact 36 and contact 37, it will disconnect the capacitor 23 from ground, and the oscillator will produce a signal made up of oscillations at $F_1$; however, when the blade 35 is in engagement with either contact 36 or contact 37, the capacitor 23 will be connected in parallel with the coil 21 and the capacitor 22, and the oscillator will produce a signal made up of oscillations at $F_2$.

The blade 35 is operated by a magnet 38, which has one side connected over a current-limiting resistor 39 and conductor 40 to the positive terminal of the battery 10 when the manually operable switch 11 is closed, and which has its other side directly connected to ground. A second blade 45, which is connected to blade 35 for operation therewith by the magnet 38, carries a contact which can short out magnet 38 when the magnet has been energized and has operated the blades. The blade 45 and the magnet 38 are so arranged that the magnet will operate the blades 35 and 45 at a rapid rate, as, for instance, at a frequency of about ninety-six operations per second. This operation of the vibrator will cause alternating signals made up of oscillations at $F_1$ and at $F_2$ to be generated, each at about 192 per second.

Contacts in positions 8, 10, 12, 14, 20, 22, 24, 26, 28, and 30 steps clockwise from home position in portion CS-1 (Fig. 1) are directly connected to the capacitor 23, and, as the wiper steps past these contacts, it will connect these contacts to other contacts which are directly connected to ground, thereby connecting capacitor 23 to ground, which places capacitor 23 in parallel with coil 21 and capacitor 22 and causes the oscillator to oscillate at frequency $F_2$ to generate signals, which are made up of oscillations at $F_2$, when the wiper is in any of these positions.

When the wiper is in positions 2, 4, 6, 16, 18, 32, 34, and 36 (Fig. 1), the capacitor 23 is not grounded and the oscillator will oscillate at frequency $F_1$ and will generate signals made up of oscillations at $F_1$.

Accordingly, as the wiper traverses contacts in positions from 2 through 36, it will cause the required normal signal sequence to be generated.

When the lights of the automobile are lighted and the relay 30 (Fig. 1) is energized, it will connect the capacitor 23 to the contact in position 38 so that, when the wiper moves into engagement with this contact, it will connect this contact to a grounded contact and will cause the additional signal, made up of oscillations at $F_2$ in the modified signal sequence, to be generated.

The portion CS-3 of the switch controls the stepping of the switch. As seen from Fig. 1, the manually-operable switch 11, when operated, also connects positive terminal of the battery 10, over conductor 46, to one side of the switch-operating magnet CSM. The other side of the switch-operating magnet CSM is connected over a self-interrupter contact 47 to a conductor 48, which is connected directly to contacts in positions 2 to 49 clockwise from home position in portion CS-3, as seen in Fig. 1. Conductor 48, which is connected to the home position contact in portion CS-3, over a normally open, manually-operable "Stop and Restore" switch 49, is also connected to the contact in the first position clockwise (Fig. 1) from home position in portion CS-3 over a normally open manually-operable "Operate" switch 50. Whenever the circuit from the switch-operating magnet CSM is connected to a contact in the portion CS-3, it will be completed by the engagement of the wiper with that contact, because the wiper related to this bank of contacts is connected to ground.

Accordingly, after switch 11 has been operated to prepare the sending apparatus for operation, the operation of the "Stop and Restore" switch 49 will complete the circuit through the wiper in its home position and will cause the operating magnet CSM to be operated and move the wipers clockwise (Fig. 1), in all three portions, one step into their first position, where the wiper in the second portion CS-2 grounds the grid-leak resistor 18 to render the oscillator operable, and the wiper in the first portion CS-1 connects the additional capacitor to ground through the vibrator blade 35 to control the oscillator to cause signals made up of oscillations at $F_1$ and signals made up of oscillations at $F_2$ to be generated alternately in rapid succession, which signals cause various parts of the receiving apparatus to be restored to normal or home position and any uncompleted operation of the garage door operating mechanism to be interrupted.

When the wiper in portion CS-3 moves clockwise (Fig. 1) into its first position, it will open the circuit of the operating magnet CSM. After the sending apparatus has operated to send out signals which are made up of oscillations at $F_1$ and signals which are made up of oscillations at $F_2$, alternately in rapid succession, for a sufficient time to allow the parts of the receiving apparatus to be restored, the "Operate" switch 50 can be closed momentarily to complete the circuit to the operating magnet CSM to cause the wipers to be moved clockwise (Fig. 1) to their second position. Since contacts in positions 2 to 49 inclusive in the third portion CS-3 are connected to conductor 48, they will cause the operating magnet CSM to be operated repeatedly as the wiper is stepped thereover and will cause the switch to self-operate into its home position. This self-operation of the switch occurs at about fifty steps per second, and, during this portion of the operation of the switch, the required signal sequence is sent out.

The operation of the above-described portion of the novel remote control system is as follows:

When the automobile is in the vicinity of or is approaching the garage, the sending apparatus, which is carried by the automobile, can be made ready for operation by closing the manually operable switch 11, which connects various parts of the sending apparatus to the positive terminal of the battery 10 of the automobile. Thereafter the "Stop and Restore" switch 49 can be operated to step the controller switch one step to cause signals at $F_1$ and signals at $F_2$ to be radiated alternately in rapid succession from the coil 21 when the frequencies $F_1$ and $F_2$ are in lower frequencies or from an antenna when the frequencies $F_1$ and $F_2$ are in the higher frequencies, which coil or antenna is conveniently located behind the usual radiator grill or at some other convenient part at the front of the automobile. The rapidly-alternating signals, which are made up of oscillations at $F_1$ and $F_2$, operate the receiving apparatus to restore the several parts thereof to home position. When sufficient time has elapsed to enable the parts of the receiving apparatus to have been restored, the switch 49 can be opened and the "Operate" switch 50 can be operated to complete the circuit to the switch-operating magnet CSM, which will be energized and step the controller switch into its second position, where the portion CS-3 of the switch will take over and cause the switch to be stepped forward automatically to home position, during which stepping, portions CS-1 and CS-2 of the controller switch control the oscillator to generate the required signal sequence containing the preselected numbers of signals, which are made up of oscillations at frequencies $F_1$ or $F_2$.

It is obvious that the signal sequence could easily consist of signals made up of oscillations at any one of three or more selected frequencies merely by providing further additional capacitors, as 23, which could be connected to desired ones of the contacts of the portion CS-1 to be connected in parallel with the coil 21 and the capacitor 22, as in the case of the additional capacitor 23, to cause the oscillator to generate the additional selected frequencies.

The signal sequence also can readily be altered simply by changing the connections between the capacitor 23 and the contacts in the portion CS-1 and by making similar changes in the connections in the portion CS-2.

Figure 2:
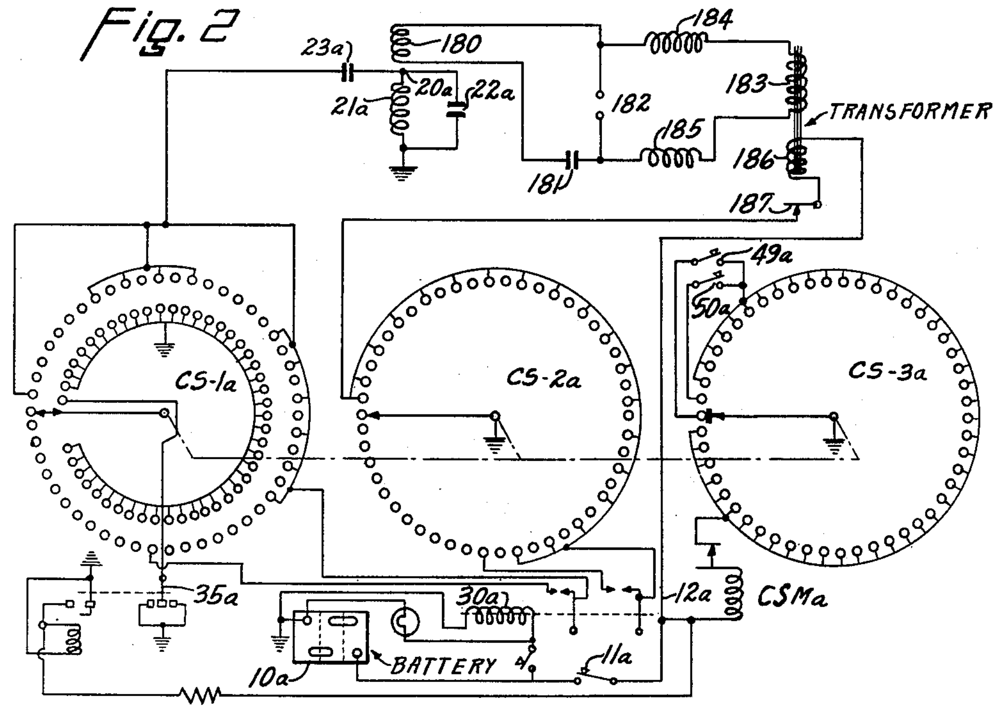
Fig. 2 is a circuit diagram showing a modified form of sending apparatus.

Fig. 2 shows a modified form of sending apparatus which uses the shock excitation of a resonant circuit to produce the desired signals and which can be controlled to produce oscillations at different frequencies as $F_1$ and $F_2$.

The signal generator includes a resonant circuit made up of an inductance coil 21*a* and capacitor 22*a*, which circuit is tuned to oscillate and generate signals which are made up of oscillations at frequency $F_1$, and also includes a second capacitor 23*a*, which can be connected across the coil 21*a* and the capacitor 22*a* to change the resonance of the circuit and cause the circuit to oscillate at frequency $F_2$ to produce signals which are made up of oscillations at $F_2$. In order to cause the resonant circuit to oscillate, it is excited by a magnetic field set up in a coil 180, which field influences the coil 21a.

Coil 180 is connected in series with a capacitor 181 across a spark gap 182. The spark gap 182 is connected across the high-voltage coil 183 of a transformer which is capable of supplying alternating operating potential to this circuit. Radio frequency choke coils 184 and 185 are provided to protect the coil 183. When the voltage builds up in the coil 183, it will charge the capacitor 181, and, when the gap 182 breaks down, capacitor 181 will also be discharged therethrough and with coil 180 will constitute a resonant circuit having a low decrement.

As the current flows in the coil 180, a field will be set up which shock-excites the coil 21a and causes the signal-generating circuit to oscillate to produce a signal made up of oscillations at $F_1$ or $F_2$, depending upon whether or not capacitor 23a is in the circuit.

The signals generated in this signal-generating circuit will be radiated from coil 21a directly if the frequencies are in the lower range or from a straight wire antenna connected to point 20a, if the frequencies are in the higher range.

The circuit to the low-voltage coil 186 of the transformer will be prepared when the preparing switch 11a is closed to connect one side of the coil to the positive terminal of battery 10a. Negative terminal of battery 10a is grounded, and the circuit to coil 186 will be completed from the other side of the coil, over normally closed contact 187 and contacts in portion CS–2a when the grounded wiper in this portion is moved into engagement therewith.

When the circuit to coil 186 is completed and current flows through the coil, the resulting magnetic field will cause contact 187 to be opened to interrupt the current flow, causing the field to decay and allowing the contact 187 to reclose. This building up and decay of the field resulting from the intermittent interruption of current in coil 186 by switch 187 will induce the alternating potential in the high-voltage coil 183, which causes the gap 182, to break down, and enables coil 180 to cause the signal-generating circuit to oscillate and produce the required signal.

The wiper in portion CS–2a of the controller switch will ground contacts in positions 1, 2, 4, 6, 8, 10, 12, 14, 16, 18, 20, 22, 24, 26, 28, 30, 32, 34, and 36 clockwise from the normal or home position, shown in Fig. 3, and will cause the signal-generating means to oscillate whenever the wiper is on any one of these contacts.

The wiper in portion CS–1a grounds capacitor 23a through the vibrator blade 35a in the first position clockwise from normal to cause signals made up of oscillations at frequency $F_1$ and signals made up of oscillations at frequency $F_2$ to be generated alternately in rapid succession and grounds the capacitor directly in positions 8, 10, 12, 14, 20, 22, 24, 26, 28, and 30 steps clockwise from home position to cause signals made up of oscillations at frequency $F_2$ to be generated whenever the wiper is in any one of these positions.

The wiper in portion CS–3a, in conjunction with switches 49a and 50a, controls the operation magnet CSMa to cause the stepping of the switch through its cycle of operation in the same manner as the wiper CS–3, and switches 49 and 50 control the magnet CSM to cause stepping of the switch during the sending operation, as explained in connection with Fig. 1.

The light circuit of the automobile contains a relay 30a, which enables wipers in portions CS–1a and CS–2a to ground capacitor 23a and coil 186, respectively, in the thirty-eighth position of the switch to cause the extra signal, made up of oscillations at frequency $F_2$, to be sent out to control the garage light circuit.

The type of sending apparatus shown in Fig. 2, therefore, can generate signals which will cause the operation of the door-operating mechanism to be interrupted and the receiving apparatus to be restored to normal or home position, can generate the normal signal sequence to cause an operation of the garage-door-operating mechanism, and can generate the modified signal sequence to cause an operation of the garage-door-operating mechanism and to control the operation of the garage light circuit.

While the form of the invention shown and described herein is admirably adapted to fulfill the objects primarily stated, it is to be understood that it is not intended to confine the invention to the one form or embodiment disclosed herein, for the novel remote control system is susceptible of embodiment in various forms all coming within the scope of the claims which follow.

What is claimed is:

1. In a transmitting system, the combination of a sending apparatus including oscillating means for producing oscillations selectively at either of two preselected frequencies, from which oscillations at one of said frequencies, one type of signal is constituted, and from which oscillations at the other of said frequencies, another type of signal is constituted, a first oscillating means control circuit having a time constant for controlling the oscillating means to cause it to oscillate at one of said frequencies to produce signals of said one type, a second oscillating means control circuit for modifying the time constants of said first circuit to cause the oscillating means to oscillate at the other of said frequencies to produce signals of said other type, a signal sequence controlling switch having a plurality of banks of contacts and wipers moved past the contacts of the banks in unison to complete circuits thereto, said first control circuit being connected to predetermined contacts of one of said banks to cause said oscillator to operate whenever a wiper is on one of said predetermined contacts, and said second control circuit being connected to selected contacts of the other bank of contacts to cause the control of the oscillator to be modified whenever a wiper is on one of said selected contacts to which the second control circuit is connected, the signal sequence controlling switch causing signals of said one type to be generated when the wipers engage contacts to which only said first circuit is connected and causing signals of the other of said types to be generated when the wipers simultaneously engage contacts in both banks which are connected to the first and second control circuits, the particular connections to the contacts controlling the oscillating means to produce the signals of a normal signal sequence, which sequence is made up of groups of various predetermined numbers of signals of said one type and groups of various predetermined numbers of signals of said other type, with the type of signals for successive predetermined numbers of signals alternating until the normal signal sequence is completed, means to drive the wipers past the contacts, and a relay which can be selectively energized and, when energized, connecting the first and second control circuits to further contacts in said banks to modify the control of the control means to produce a modified signal sequence, which modified signal sequence is made up of said normal signal sequence and an additional predetermined number of signals of the type opposite the last type of the normal signal sequence.

2. In a sending apparatus for remotely controlling the operation of an apparatus from a vehicle, the combination of a signal-generating means; control means automatically operable upon an initiation of an operation thereof to control the signal-generating means to generate a signal sequence for causing the operation of the remote apparatus; means to initiate the automatic operation of the control means; further control means to control the signal-generating means to generate a special signal sequence for causing the interruption of an operation of the remote apparatus, and means, operable at will after the operation of the remote apparatus has been initiated, for causing the further control means to be operable to cause the special signal sequence to be generated whereby an operation of the remote apparatus, once started, can be interrupted at will by signals sent from the sending apparatus in the vehicle.

3. In a radio transmitting system, the combination of an electronic oscillator; a first control circuit connected to the oscillator and having circuit constants for causing the oscillator to produce oscillations at one frequency; a second control circuit for modifying the constants of the first control circuit and jointly operable therewith to cause the oscillator to produce oscillations at a second frequency; a control means automatically operable upon an initiation of an operation thereof to generate a control sequence, said control means including a switch having a plurality of banks of contacts and wipers engaging corresponding contacts in the several banks during the automatic operation of the switch, the first control circuit being connected to selected contacts in one of said banks and the second control circuit being connected to selected contacts in the other bank of contacts, and the wipers rendering the control circuits effective when they engage contacts in the banks to which the control circuits are connected, the switch causing oscillations to be produced at said one frequency to form one type of signal when the wipers engage contacts to which said first control circuit is connected and causing oscillations to be produced at said other frequency to form another type of signal when the wipers engage contacts to which both control circuits have been connected, said switch enabling the two control circuits to be selectively effective to cause the oscillator to produce a signal sequence containing a plurality of groups of signals with various predetermined numbers of signals in the groups and with the signals of odd-numbered groups being of said one type and with the signals of even-numbered groups being of said other type; and means to initiate an operation of the control means.

References Cited in the file of this patent

UNITED STATES PATENTS

| Number | Name | Date |
|---|---|---|
| 1,760,479 | Colman | May 27, 1930 |
| 2,069,860 | Stewart | Feb. 9, 1937 |
| 2,118,930 | Lilja | May 31, 1938 |
| 2,505,781 | Mallinson | May 2, 1950 |